Apr. 10, 1923.

F. LJUNGSTROM ET AL

REVERSIBLE GEARING

Filed Nov. 4, 1921

1,451,266

2 sheets-sheet 1

Inventors
F. Ljungstrom
I. Broberg
E. O. Eriksson
By Marks & Clerk Attys

Apr. 10, 1923.　　　　　　　　　　　　　　　　　　　1,451,266
F. LJUNGSTROM ET AL
REVERSIBLE GEARING
Filed Nov. 4, 1921　　　　　　　　2 sheets-sheet 2
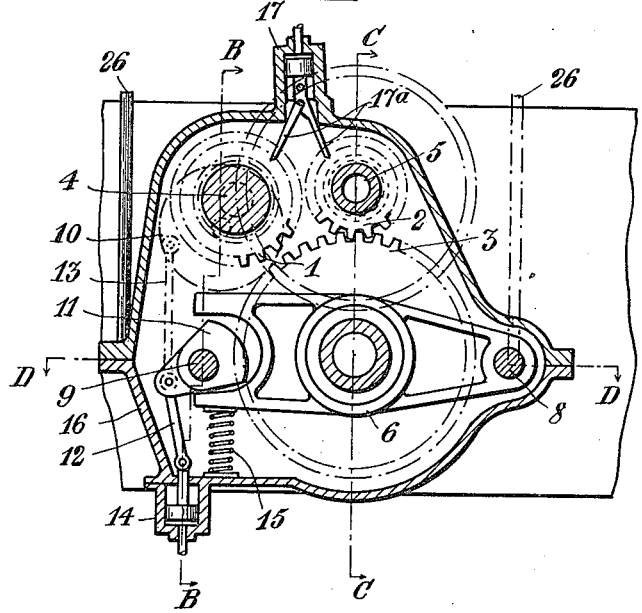
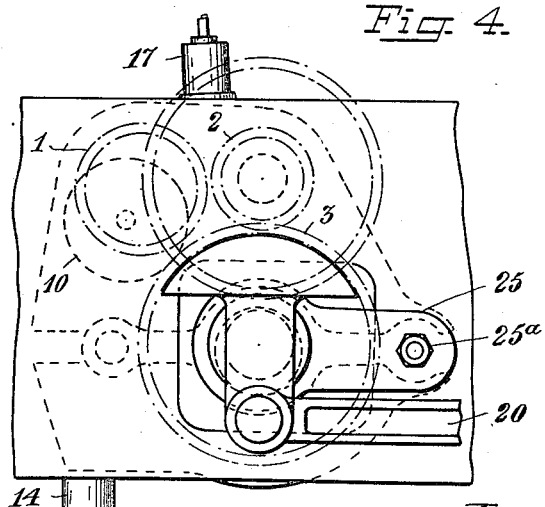
Inventors
F. Ljungstrom
I. Broberg
E. O. Eriksson
By Marks & Clerk
Attys.

Patented Apr. 10, 1923.

1,451,266

UNITED STATES PATENT OFFICE.

FREDRIK LJUNGSTROM, ISIDOR BROBERG, AND ERIK OTTO ERIKSSON, OF STOCKHOLM, SWEDEN, ASSIGNORS TO AKTIEBOLAGET LJUNGSTRÖMS ANGTURBIN, OF STOCKHOLM, SWEDEN.

REVERSIBLE GEARING.

Application filed November 4, 1921. Serial No. 512,948.

*To all whom it may concern:*

Be it known that FREDRIK LJUNGSTROM, ISIDOR BROBERG, and ERIK OTTO ERIKSSON, citizens of Sweden, residing at Arsenalsgatan 2, Stockholm, Sweden, have invented certain new and useful Improvements in Reversible Gearings (for which we have filed applications in Sweden Sept. 28, 1920, No. 4,818, of 1920; in Germany May 24, 1921, No. 35,528), of which the following is a specification.

This invention relates to a reversible gearing of the type in which, in order to effect running forwards or backwards, one or more driving wheels and one or more wheels driven by the same are arranged, the latter wheels being supported by a lay-shaft, for instance a crank shaft of a locomotive, and adapted to be set into and out of engagement with the driving wheels and one or more intermediate wheels.

The invention is especially useful in gearings in which the intermediate wheels are moved towards and from the other wheels at right angles to the shafts of the latter.

The feature substantially characterizing the invention consists in that the lay-shaft is journalled on the one hand in one or more swingable arms journalled in a housing enclosing the gearing and on the other hand in one or more supporting links journalled at fixed points in a frame stationary in relation to the shaft, the arms and the links being preferably swingable about co-axial axes and the housing being suspended by pendulums.

Figure 1:
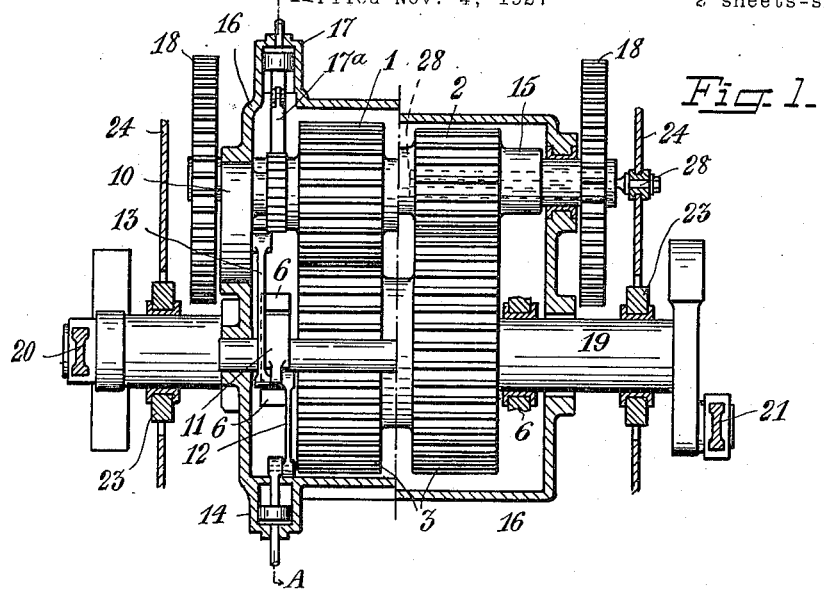
Figure 3:
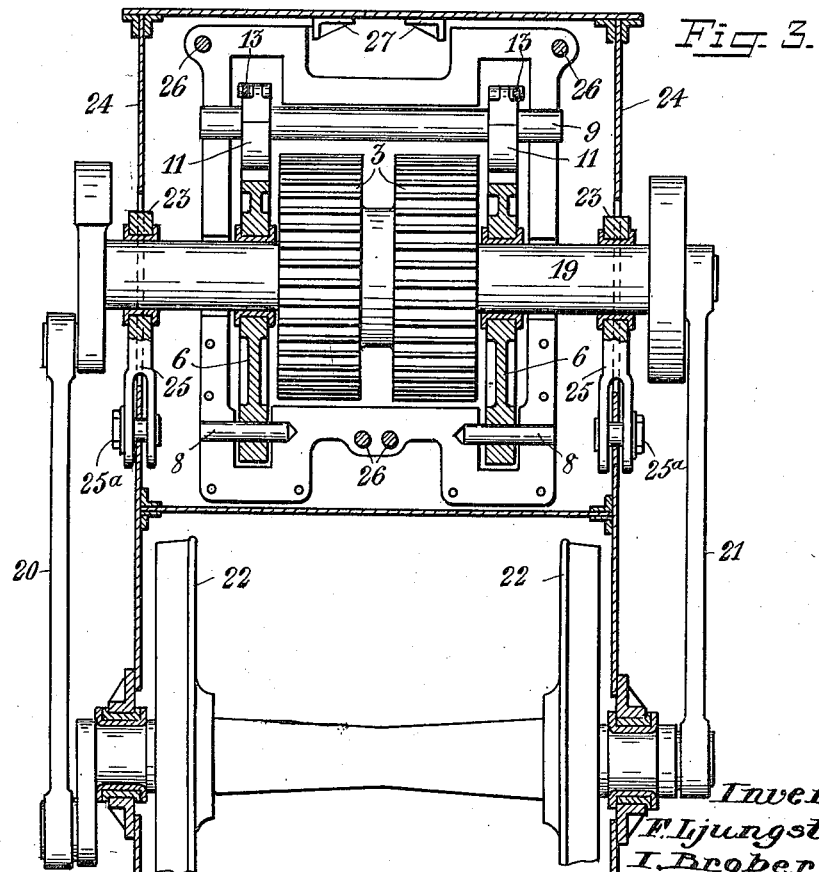

A preferred embodiment of the invention is illustrated in the accompanying drawing showing the same applied to a reversible gearing in a locomotive. The left half of Fig. 1 is a section on line B—B in Fig. 2 and the right half of Fig. 1 is a section on line C—C in Fig. 2. Fig. 2 is a section on line A—A in Fig. 1. Fig. 3 is a section on line D—D in Fig. 2 and Fig. 4 is an outer view.

In the drawing the invention is shown as applied to a double gearing. 2 designates the motor driven wheels attached to a shaft 5 which is driven by means of one or more toothed wheels 18. 3 designates wheels driven by the toothed wheels 2 and adapted to be set into and out of engagement with the same. 1 indicates intermediate wheels adapted to be set into or out of engagement with the wheels 2 and 3. The reversing of the gearing is effected by the wheels 3 being either set into engagement directly with the wheels 2, while the wheels 1 are out of engagement with both groups of wheels, thus effecting forward running, or by the wheels 3 being set out of engagement with the wheels 2, while the wheels 1 are set into engagement with both groups of wheels, thus effecting backwards running.

Said movements of the wheels 1 are effected by means of a piston disposed in a cylinder 14 and adapted to be actuated for instance by the aid of oil under pressure, the piston rod being connected by means of connecting rods 12 and 13 with a rotatable disk 10 to which the shaft 4 of the intermediate wheels 1 is secured eccentrically.

The wheels 3 are attached to a lay-shaft 19 which in the embodiment shown serves as the crank shaft of the locomotive and transmitting through connecting rods 20 and 21 the power to the driving wheels 22. The movement of the wheels 3 towards and from the wheels 2 is effected by the following means. The connecting rod 12 is journalled to one of two cam disks 11 each of which engages a recess at the one end of an arm 6, the other end of which is adapted to swing about a shaft 8. The lay-shaft 19 is journalled in the arms about at the middle of the same, and consequently, upon the movement of piston in the cylinder 4, the arms 6 will swing about the shafts 8 and the above-mentioned movements of the wheels 3 will be effected. The arms 6 are supported by springs 15.

In order that the wheels of the gearing may be set into proper engagement with one another they are actuated by the aid of a piston movable in a cylinder 17 and driven by means of oil under pressure, the piston being connected with the arms 17ª. The points of these fingers coact with the gears 1 and 2 and are so arranged that when no oil pressure exists in the cylinder 17 they are brought out of engagement with the gears by suitable means. When in operation, oil is admitted to the cylinder and the piston is moved downwardly whereby the gears 1 and 2, provided they are not in mesh, are turned to such positions that proper meshing thereof may take place. The fingers 17ª differ as to their length to an extent corresponding to half the amount of the circular pitch of the gears 1 and 2 and owing to this fact, when the fingers 17ᵃ are in operative positions, a tooth of one of the gears is so disposed as to freely slip into the space between two adjacent teeth of the other gear.

The wheels of the gearing are enclosed by a housing 16 suspended by supporting rods 26, the other ends of which are attached to the stationary frame of the locomotive (not shown). The shafts 4 and 5 are journalled in the housing 16, whereas the lay-shaft 19 is passed through openings in the housing. The lay-shaft is on the one hand, as mentioned above, journalled in the arms 6, the shafts 8 of which are secured to the housing 16, and on the other hand in bearings 23 placed in supporting links 25 which are swingable about pins 25ᵃ attached to a fixed outer casing 24 and preferably co-axial with the shafts 8. The housing 16 is to a certain extent guided by stationary projections 27. Secured to the fixed outer casing 24 is a rod 28 passing through a bore in the shaft 5 and engaging the same in such manner that axial movement of the wheels 2 is prevented.

By the above described arrangement of the wheels of the gearing and by the aid of the housing 16 which to a certain extent is movable horizontally but prevented from vertical movement, obliquely acting pressure on the teeth is avoided, since the movable housing receives the powers arising on account of the varying pressures on the teeth, whereas the reacting powers of the crank motion are received by the bearings 23 or the supporting links 25 connected with the stationary outer housing.

What we claim as new and desire to secure by Letters Patent of the United States is:—

1. In a reversible gearing, a relatively stationary frame, a housing, arms swingably mounted in said housing, a lay-shaft journaled in said arms, a driven gear on said shaft, bearing links for said shaft pivoted to said frame and mounted for swinging movement, a driving gear adapted to be operatively engaged by the first mentioned gear, and an intermediate gear associated with the first and second named gears, the several gears being arranged within said housing.

2. In a reversible gearing as claimed in claim 1, the provision of rods suspending the housing.

3. A reversible gearing as claimed in claim 1 characterized by the co-axial relation of the pivotal axis of the arms and bearing links.

4. In a reversible gearing as claimed in claim 1, the arrangement of the arms adjacent the driven gears and between the latter and the housing.

5. In a reversible gearing as claimed in claim 1, the provision of a supporting shaft for the driving gear, and means carried by the relatively stationary frame preventing axial movement of the driving gear supporting shaft.

In witness whereof we have hereunto set our hands in the presence of two witnesses.

FREDRIK LJUNGSTRÖM.
ISIDOR BROBERG.
ERIK OTTO ERIKSSON.

Witnesses:
L. BEIG VON LUEDE,
ERIC HALGOR.